UNITED STATES PATENT OFFICE 2,662,927

DIARYLGUANIDINE VULCANIZATION ACCELERATORS

Martin L. Nadler, Wilmington, Del., assignor to E. I. du Pont de Nemours & Company, Wilmington, Del., a corporation of Delaware No Drawing. Application October 19, 1951, Serial No. 252,209

6 Claims. (Cl. 260—797)

This invention relates to an improvement in diarylguanidine vulcanization accelerators, and more particularly to the manufacture of di-ortho-tolylguanidine and diphenylguanidine in a form of dustless aggregates which have improved handling and application properties.

When the diarylguanidines to which the present invention relates are incorporated into rubber stocks, they must necessarily be reduced to a degree of fineness which is ordinarily considered to be powder and therefore they are difficult to handle without dusting, which presents several problems. Inhalation of dust in any case is unpleasant, and in some cases may be irritating to persons handling such material. Such dusting also presents a loss of material and may cause objectionable contamination of other materials being worked on in its presence. Heretofore it has been the practice to facilitate incorporation of such vulcanization accelerators into the rubber stocks to prepare concentrated master batches of the accelerator in rubber, but in doing this a considerable amount of caking on the back roll of the rubber mill often occurs, materially increasing the time cycle of the milling operation even when this is carried out on smaller mills, but the problem is greatly increased when such master batches are prepared on commercial rubber mills having rolls of 30 inch diameter or greater and when the rubber temperatures become high. The fluffy nature of these compounds therefore requires considerable attention by the operator in preparing the master batches. It has been found that these diarylguanidine vulcanization accelerators must be very uniformly dispersed in the rubber, which is usually carried out in the milling operation, for visible specks or agglomerates appearing in the rubber to be vulcanized causes non-uniform vulcanization. Concentrated master batching on roll type mills accentuates this problem.

Heretofore attempts have been made to reduce the dustiness of these compounds by adding oil in small amounts, and such products have been sold as ground powders. While these products are markedly less dusty than the untreated powder, they are definitely not dustless and they still tend to cake on the mill roll during their incorporation into rubber.

It is therefore an object of the present invention to prepare di-ortho-tolylguanidine and diphenylguanidine as compositions for incorporation into elastomeric materials such as natural and synthetic rubbers, which can be readily formed into dustless aggregates of definite mechanical strength but capable of being readily disintegrated in the elastomers during a milling operation, which compositions are substantially dustless and do not cake on the mill rolls during their incorporation into rubber stocks or in the preparation of master batches containing higher concentrations of these diarylguanidine vulcanization accelerators.

I have found that the di-ortho-tolylguanidine and the diphenylguanidine may be produced in the necessary degree of fineness but in a substantially dustless form when there is incorporated therewith from 1.0% to 3.0% of their weight of a triaryl phospate of the benzene series (such as tricresyl phosphate) which is liquid at 60° C., and from 1.0% to 4.0% by weight of an aliphatic hydrocarbon oil such as those generally referred to as petroleum lubricating oils. While the addition of these two materials to the diarylguanidine gives products greatly improved over those heretofore prepared, a still further improvement results from the addition of from 0.2% to 1.0% by weight of the diarylguanidine of a sorbitan ester of a fatty acid in which the fatty acid radical of the ester contains from 12 to 20 carbon atoms, preferably the monolaurate.

The diarylguanidines are preferably used in this invention in the form of their aqueous slurries, which may be made either by suspending the dry, powdered material in water or by adding an alkali to solutions of their hydrochlorides or other salts in water.

The triaryl phosphate and the hydrocarbon oil are incorporated with the diarylguanidines, preferably in the form of an aqueous slurry or an aqueous emulsion, and when the sorbitan mono-ester is employed it may be added either to the original aqueous slurry of the diarylguanidine or to the dispersion or emulsion. After thoroughly mixing the diarylguanidine aqueous slurry with the additives, the resulting slurry is filtered and the cake is washed with water. The resulting diarylguanidine products having incorporated therein the triaryl phosphate, hydrocarbon oil and sorbitan mono-ester (when the latter is employed) are then dried and pulverized and may be used in this form for milling into the elastomers. The dried material, although in very finely divided form, does not exhibit any appreciable dustiness but is of a consistency that it may be compressed into compact masses having a definite mechanical strength. If desired, the filter cake from the aqueous slurry may be compressed prior to drying, and in either case the pressed masses are granulated to form aggregates of the desired size, and if set, they are then dried and packaged. Although these aggregates prepared either from the dry press cake or the wet press cake are strong enough to resist disintegration in normal handling, they are readily broken up and dispersed in the elastomer during the usual milling operation.

In forming the aqueous dispersion of the triaryl phosphates and the hydrocarbon oils, these ingredients may be simply mixed in water although it is advantageous to have present a dispersing agent of the type of the water soluble alkali metal salts (such as Na, K, NH$_4$) of long chain aliphatic alcohol sulfates or hydrocarbon sulfonates or polynuclear aromatic hydrocarbon sulfonates. Such dispersing agents are usually employed in amounts ranging from 1.0% to 3.0% by weight based on the diarylguanidine and are washed out with water before the coated guanidine is compacted. The expression "long chain" is used to refer to those of from about 12 to about 20 carbon atoms. The term "polynuclear aromatic hydrocarbon" is used to refer to those containing from 2 to 4 benzene rings, which may be fused, and consisting only of C and H, except for the atoms of the sulfonic groups.

The triaryl phosphate used may be derived from any phenol of the benzene series, providing that the resulting ester is liquid at 60° C. and, preferably, at ordinary room temperature (25° C.). The aryl groups may be the same or different. Although the phenols derived from mixed cresols are preferred, phenol itself, the xylenols, carvacrol, thymol and the like may be used.

The products of this invention may be prepared without the addition of the sorbitan monolaurate or other sorbitan ester, but its use is preferred. The sorbitan ester, preferably, is added to the aqueous solution of guanidine hydrochloride, to which alkali is added to precipitate the free guanidine. In this respect the sorbitan ester apparently serves to provide more uniform sized particles of guanidine. In place of the monolaurate of sorbitan, the palmitate, oleate or stearate, or other monoester of a fatty acid containing 12 to 20 carbon atoms may be used, providing that the resulting monoester is liquid at the temperature at which it is used, that is, above 25° C. and usually 30° C. to 60° C.

The aliphatic hydrocarbon oil employed may be any of the water-immiscible, high-boiling oils such as are commonly sold for lubricating purposes. Two common oils of this type sold for use in rubber and other elastomers are the well-known "Circo light process oil" and "A-1 oil." Such oil must be liquid at the temperature employed in preparing the dust-free compounds.

The aggregates of di-ortho-tolylguanidine and diphenylguanidine produced by this invention are free-flowing compared to ground powders, with resultant ease of handling. They are virtually dustless and superior in this respect to oil-treated powders. As illustrated quantitatively below, they do not readily disintegrate back to powder on normal handling. They show a greatly reduced tendency to cake on the back roll of the rubber mill in masterbatching. Their speed of incorporation in rubber is greater than that of ground powders, including those which have been oil-treated. The completeness of dispersion of the ultimate particles of the guanidines is at least equal to that of finely ground powders. Because of their physical form, physiological action is reduced.

By this invention it is possible to achieve manufacturing savings since the preformed wet aggregates are suitable for continuous drying in a through-circulation type of air dryer and grinding of the product is eliminated. In addition, the filtration rate of the slurry is improved by the presence of the additives.

The aqueous guanidine slurry used in the present invention may be either the crude slurry from manufacture or a slurry prepared by agitating the isolated material (which may also have been dried and ground) in water. In any case, the guanidine, before and after coating, will be in finely divided form, substantially all of the particles being of a size to pass through a standard Tyler 100 mesh screen. The sorbitan ester may be added before the precipitation step, as heretofore mentioned, or to the slurry directly. Although the tricresyl phosphate and hydrocarbon oil may be added directly to the aqueous slurry, it is desirable to emulsify these components first in water. The wet filter cake may be dried (and ground) before performing. A variety of mechanical means for compressing and preforming the wet filter cake may be employed, such as pelleting machines, roll mills, extruding machines, with either plunger, screw or other feed. Accordingly, the material may be compressed into pellets, plates, continuous sheets or continuous rods which may later be granulated to the desired size. The continuous sheets formed by compression rolls are particularly suitable for this purpose. The temperatures at which the treatment of the slurry, its washing, drying and compacting take place may vary widely, except that they should be below the boiling point of water. It is convenient to treat the slurry at from 30° to 60° C.; no harm is suffered at 10° C. or below. When compression rolls are used, no artificial heating or cooling is normally required.

It is usually desirable that the aggregates should have a width of from $\frac{1}{16}$ inch to $\frac{1}{4}$ inch and a length from $\frac{1}{16}$ inch to about 1 inch. When the aggregates are made in a granulator, as in the example below, their length may be varied by controlling the water content of the material granulated. Thus, at 35% moisture, the length is about $\frac{1}{8}$ inch to $\frac{1}{2}$ inch, while at 50% moisture the length is about $\frac{1}{2}$ inch to about 2 inches. Compression and granulation are most readily carried out with coated guanidines containing about 40% water.

Although the diaryl guanidines used in this invention may be made in any way, a convenient method is described in U. S. Patent 1,886,087, wherein the appropriate aromatic amine is reacted with cyanogen chloride in a benzene hydrocarbon, the free base is liberated by adding caustic, impurities are removed by steam distillation, and the base is further purified by conversion to the hydrochloride and reprecipitation. The final slurry may be used without filtration for making the coated material of the present invention.

The following example is given to more fully illustrate the invention. The parts, percentages or proportions are by weight unless otherwise specified.

*Example*

An aqueous slurry containing approximately 783 parts of di-ortho-tolylguanidine in 24,000 parts of water was prepared by the simultaneous addition of an aqueous solution containing 900 parts of di-ortho-tolylguanidine hydrochloride and an aqueous solution containing 138 parts of NaOH to water containing 4 parts of sorbitan monolaurate. The resulting slurry containing about 3.3% of suspended guanidine was adjusted to show an alkaline reaction to Clayton Yellow indicator paper. Vigorous agitation was used throughout this period.

To the slurry, under agitation, was then added an aqueous dispersion of 24 parts of hydrocarbon oil (A–1 oil), 16 parts of tricresyl phospate and 4 parts of the sodium salt of isopropyl naphthalene sulfonic acid, in approximately 200 parts of water.

Four hundred (400) parts of the resulting slurry were then filtered on an Oliver continuous filter, one foot in diameter and one foot long. The filter cake was then mechanically compressed to about one-quarter of its original volume. At this point the filter cake contained 38% water. The compressed filter cake, without drying, was granulated in a well-known commercial granulator which comprises a semicircular trough, the bottom of which is formed by a six mesh wire screen, provided on the inside with a series of blades arranged parallel to the axis of the trough and given a circular, back and forth, or oscillating motion over the inner surface of the screen. These blades knead the material together into a mass and rub such mass through the screen. The material issues from the under side of the screen as jointed, continuous structures, each consisting of a series of short prisms of approximately ⅛ inch square cross-section (corresponding to the orifices of the screen) with the direction of the sides changing at each joint through an angle corresponding to the reversal in direction of the blades as they press the material through the screen. The joints are points of weakness in the extruded structures which, as they grow longer, break under their own weight at these points, forming aggregates consisting of several jointed prisms with an overall length of ¼ inch to ½ inch. The resulting aggregates were then dried in an air oven at 105° to 110° C. The melting point of the dry product was 171.5° C. The aggregates were firm and did not readily disintegrate on handling, as is shown quantitatively below.

A two-pound sample of this preformed di-ortho-tolylguanidine was tested by making up as a 20% masterbatch in pale crepe rubber on a 30 inch diameter roll mill heated by internal hot water to maintain the temperature of the rolls at 70° C. The batch incorporated rapidly without dusting and with no caking on the back roll of the mill. At the end of the milling, the rolls were clean and shining. A sample of the rubber was stretched out into a thin film and examined. No undispersed particles of di-ortho-tolylguanidine were found.

By way of comparison, two pounds of commercial, dry di-ortho-tolylguanidine were milled under similar conditions. A considerable amount of unpleasant dusting occurred at the mill; the guanidine incorporated slowly and there were present in the milled rubber specks of undispersed quanidine.

When less than 1% of phosphate is used, the compression step requires undue pressure, since the particles have insufficient lubricity. Similar results are obtained when less than 1% of the hydrocarbon oil is used. On the other hand, larger proportions of the additives than specified above give aggregates which do not have the required mechanical strength.

The aggregates prepared according to the foregoing example were tested for mechanical strength by placing a 50 gm. sample in a 16 ounce wide-mouth bottle, together with 8 steel balls, each about ⅜ inch in diameter, rotating the bottle end-over-end for five minutes at 47 R. P. M. and then screening the product on a 16 mesh screen. Only 3.0% of the starting material passed through the screen as "fines."

When a molar equivalent amount of diphenylguanidine hydrochloride is substituted for the di-ortho-tolylguanidine used in the first example, and the proportions of additives are similarly adjusted to the weight of di-ortho-tolylguanidine, a product is obtained which has the desirable features of the aggregates of diphenylguanidine described above.

The compounds of this invention are made particularly for use in the vulcanization of rubber, but it will be obvious that they will find utility wherever the diarylguanidine compounds are employed in elastomeric compounds, which may be either natural or synthetic rubbers, since the amount of materials added to prevent dusting and to permit proper incorporation in the elastomeric material does not detrimentally affect the resulting elastomer.

The particular combination of materials disclosed as being useful in producing the non-dusting diarylguanidine compositions has been found to be relatively specific, for other compounds previously used in the treatment of other types of rubber additives do not give the results which have been obtained according to this invention.

While a detailed description of the preparation of aggregates of a desirable size has been given, it will be understood that the filter cake, either before or after drying, may be broken up or converted to aggregates of any desired size, since the physical properties of the diarylguanidines containing the additives described is such that a substantially dustless and readily workable composition is produced.

I claim:

1. A diarylguanidine composition comprising a diarylguanidine of the class consisting of di-ortho-tolylguanidine and diphenylguanidine having intimately incorporated therein from 1.0% to 3.0% by weight of a triaryl phosphate of the benzene series and from 1.0% to 4.0% by weight of an aliphatic hydrocarbon oil, both of which are liquid at 60° C.

2. A diarylguanidine composition comprising a diarylguanidine of the class consisting of di-ortho-tolylguanidine and diphenylguanidine having intimately incorporated therein from 1.0% to 3.0% by weight of a triaryl phosphate of the benzene series and from 1.0% to 4.0% by weight of an aliphatic hydrocarbon oil, both of which are liquid at 60° C., and from 0.2% to 1.0% by weight of a sorbitan ester of a fatty acid, the fatty acid radical of which contains from 12 to 20 carbon atoms.

3. A diarylguanidine composition comprising a diarylguanidine of the class consisting of di-ortho-tolylguanidine and diphenylguanidine having intimately incorporated therein from 1.0% to 3.0% by weight of tricresyl phosphate and from 1.0% to 4.0% by weight of a petroleum hydrocarbon lubricating oil which is liquid at 60° C.

4. A diarylguanidine composition comprising a diarylguanidine of the class consisting of di-ortho-tolylguanidine and diphenylguanidine having intimately incorporated therein from 1.0% to 3.0% by weight of tricresyl phosphate and from 1.0% to 4.0% by weight of a petroleum hydrocarbon lubricating oil which is liquid at 60° C., and from 0.2% to 1.0% by weight of sorbitan monolaurate.

5. A di-ortho-tolylguanidine composition particularly useful as a vulcanization accelerator comprising di-ortho-tolylguanidine and from 1.0% to 3.0% of its weight of tricresyl phosphate, from 1.0% to 4.0% of its weight of a petroleum hydrocarbon lubricating oil liquid at 60° C., and from 0.2% to 1.0% of its weight of sorbitan monolaurate.

6. A diphenylguanidine composition particularly useful as a vulcanization accelerator comprising diphenylguanidine and from 1.0% to 3.0% of its weight of tricresyl phosphate, from 1.0% to 4.0% of its weight of a petroleum hydrocarbon lubricating oil liquid at 60° C., and from 0.2% to 1.0% of its weight of sorbitan monolaurate.

MARTIN L. NADLER.

References Cited in the file of this patent

UNITED STATES PATENTS

| Number | Name | Date |
|---|---|---|
| 2,268,501 | Bradley | Dec. 30, 1941 |
| 2,326,984 | Tomlin | Aug. 17, 1943 |
| 2,427,238 | Swart | Sept. 9, 1947 |

FOREIGN PATENTS

| Number | Country | Date |
|---|---|---|
| 522,844 | Great Britain | June 28, 1940 |